United States Patent
Olwal et al.

(10) Patent No.: US 12,008,204 B2
(45) Date of Patent: Jun. 11, 2024

(54) SCALABLE GESTURE SENSOR FOR WEARABLE AND SOFT ELECTRONIC DEVICES

(71) Applicant: Google LLC, Mountain View, CA (US)

(72) Inventors: Alex Olwal, Santa Cruz, CA (US); Thad Eugene Starner, Atlanta, GA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/001,830

(22) PCT Filed: Oct. 4, 2021

(86) PCT No.: PCT/US2021/053401
§ 371 (c)(1),
(2) Date: Dec. 14, 2022

(87) PCT Pub. No.: WO2023/059309
PCT Pub. Date: Apr. 13, 2023

(65) Prior Publication Data
US 2023/0266852 A1    Aug. 24, 2023

(51) Int. Cl.
*G06F 3/044* (2006.01)
*G06F 3/0488* (2022.01)

(52) U.S. Cl.
CPC .......... *G06F 3/0446* (2019.05); *G06F 3/0488* (2013.01)

(58) Field of Classification Search
CPC ............................. G06F 3/0446; G06F 3/0488
See application file for complete search history.

(56) References Cited

U.S. PATENT DOCUMENTS 10,145,036 B1    12/2018 Sunshine et al.
2004/0239650 A1*  12/2004 Mackey ................ G06F 3/0446
                                          345/174

(Continued)

FOREIGN PATENT DOCUMENTS

EP         3740854      6/2021
WO         2021155233   8/2021

OTHER PUBLICATIONS

"International Search Report and Written Opinion", Application No. PCT/US2021/053401, dated Jun. 30, 2022, 10 pages.

(Continued)

*Primary Examiner* — Ariel A Balaoing
(74) *Attorney, Agent, or Firm* — Colby Nipper PLLC (57) ABSTRACT

This document describes techniques directed to a scalable gesture sensor for wearable and soft electronic devices. The scalable gesture sensor is integrated into an object such as a wearable garment or a large-surface embedded system to provide a touch-sensitive surface for the object. The sensor includes a repeated localized crossover pattern formed by the same few sensor lines, resulting in the same two conductive lines having multiple crossover points across the touch-sensitive surface. The repeated crossover pattern enables detection of the occurrence and relative direction of a swipe gesture based at least on a repeated sequence of capacitance changes over a set of conductive lines in the repeated crossover pattern. Also, the scalable gesture sensor is computationally simple, uses low power, and is uniquely scalable to cover a large area with few electrodes.

20 Claims, 8 Drawing Sheets

(56) References Cited

U.S. PATENT DOCUMENTS

| | | | |
|---|---|---|---|
| 2006/0246379 A1* | 11/2006 | Jambor | G06F 3/047 430/311 |
| 2009/0286055 A1* | 11/2009 | Pourdeyhimi | H05K 1/0393 428/201 |
| 2010/0004720 A1* | 1/2010 | Li | A61N 1/0408 607/152 |
| 2016/0048236 A1* | 2/2016 | Poupyrev | G06F 1/163 345/174 |
| 2016/0103520 A1* | 4/2016 | Kim | G06F 3/0445 345/174 |
| 2016/0284436 A1* | 9/2016 | Fukuhara | H01B 1/026 |
| 2016/0328043 A1* | 11/2016 | Moller | G06F 3/0416 |
| 2018/0310659 A1* | 11/2018 | Poupyrev | A63B 43/004 |
| 2018/0338544 A1* | 11/2018 | Huang | H05K 3/368 |
| 2020/0081566 A1* | 3/2020 | Dahiya | G01L 1/146 |
| 2020/0125195 A1* | 4/2020 | Tremmel | D03D 1/0088 |
| 2020/0341570 A1 | 10/2020 | Podhajny et al. | |
| 2022/0179554 A1* | 6/2022 | Wu | G06F 3/011 |

OTHER PUBLICATIONS

Alwal, "Enabling E-Textile Microinteractions: Gestures and Light through Helical Structures", May 15, 2020, 8 pages.

Gilliland, et al., "The Textile Interface Swatchbook: Creating Graphical User Interface-like Widgets with Conductive Embroidery", Oct. 10, 2010, 8 pages.

Hughes, et al., "Intelligent RF-Based Gesture Input Devices Implemented Using e-Textiles", Jan. 2017, 19 pages.

McDonald, et al., "Knitted Sensors: Designs and Novel Approaches for Real-Time, Real-World Sensing", Dec. 2020, 25 pages.

Olwal, et al., "E-textile Microinteractions: Augmenting Twist with Flick, Slide and Grasp Gestures for Soft Electronics", Apr. 2020, 13 pages.

Olwal, et al., "I/O Braid: Scalable Touch-Sensitive Lighted Cords Using Spiraling, Repeating Sensing Textiles and Fiber Optics", Oct. 2018, 13 pages.

Parzer, et al., "RESi: A Highly Flexible, Pressure-Sensitive, Imperceptible Textile Interface Based on Resistive Yarns", Oct. 2018, pp. 745-756.

Parzer, et al., "SmartSleeve: Real-time Sensing of Surface and Deformation Gestures on Flexible, Interactive Textiles, using a Hybrid Gesture Detection Pipeline", Oct. 2017, pp. 565-577.

Pointner, "Knitted RESi: A Highly Flexible, Force-Sensitive Knitted Textile Based on Resistive Yarns. I", Jul. 2020, 2 pages.

Poupyrev, et al., "Project Jacquard: Interactive Digital Textiles at Scale", May 2016, pp. 4216-4227.

Shahmiri, et al., "Serpentine: A Reversibly Deformable Cord Sensor for Human Input", May 2019, 14 pages.

Takamatsu, "Meter-scale surface capacitive type of touch sensors fabricated by weaving conductive-polymer-coated fibers", May 2011, 6 pages.

Vallett, "Development of a Carbon Fiber Knitted Capacitive Touch Sensor", Jul. 2016, pp. 2641-2651.

Vallett, et al., "Toward Accurate Sensing with Knitted Fabric: Applications and Technical Considerations", Jun. 2020, 26 pages.

Waghmare, et al., "UbiquiTouch: Self Sustaining Ubiquitous Touch Interfaces", Mar. 2020, 22 pages.

Wu, et al., "Capacitivo: Contact-Based Object Recognition on Interactive Fabrics using Capacitive Sensing", Oct. 2020, 13 pages.

Wu, et al., "ZebraSense: A Double-sided Textile Touch Sensor for Smart Clothing", Oct. 2020, pp. 662-674.

Zhang, et al., "OptoSense: Towards Ubiquitous Self-Powered Ambient Light Sensing Surfaces", Sep. 2020, 27 pages.

"International Preliminary Report on Patentability", Application No. PCT/US2021/053401, Apr. 9, 2024, 7 pages.

\* cited by examiner

SCALABLE GESTURE SENSOR FOR WEARABLE AND SOFT ELECTRONIC DEVICES

RELATED APPLICATION(S)

This application is a national stage entry of International Application No. PCT/US2021/053401, filed Oct. 4, 2021, the disclosure of which is incorporated herein by reference in its entirety.

BACKGROUND

Many touch-sensitive sensors are designed for absolute positioning with a typical goal of tracking a two-dimensional position of a user's finger on a surface. This capability enables touch-based interfaces, motion gestures, and even multi-touch interaction with several parallel touchpoints. Some common touch-sensitive sensors use intersections between rows and columns of electrodes as sensing points, which allows for versatile sensing but requires interfacing with a large number of electrodes. Such a requirement may not be a significant issue for mobile phones or tablets, which have high-speed processing capabilities and displays that form rigid surfaces, which are also used to interface with electronic components.

However, some devices (e.g., wearable electronic devices, large-surface embedded systems) have limited physical space for their electronic components, limited processing power, and/or are worn close to the user's body. Such constraints introduce unnecessary complexities, including (i) higher costs resulting from computational needs, integrated circuits for processing, flexible printed circuit boards, and interfaces, (ii) more complex packaging, and (iii) higher power consumption.

Other systems combine conductors with radio frequency (RF) sensing to evaluate other phenomena that may occur at a single touch location. However, such systems require specific geometry and knowledge about that geometry. Further, such systems are typically computationally expensive or use high-speed sensing, which requires highly complex apparatuses and cannot be implemented in a low-power device.

Further many conventional touch-sensitive sensors either scale poorly (e.g., embroidery, traditional row/column sensing matrices) or leverage complex signal processing to infer phenomena from a few electrodes (e.g., high-speed RF-signals from time domain reflectometry).

SUMMARY

This document describes techniques directed to a scalable gesture sensor for wearable and soft electronic devices. The scalable gesture sensor is integrated into an object such as a wearable garment or a large-surface embedded system to provide a touch-sensitive surface for the object. The sensor includes a repeated localized crossover pattern formed by the same few sensor lines, resulting in the same two conductive lines having multiple crossover points across the touch-sensitive surface. The repeated crossover pattern enables detection of the occurrence and relative direction of a swipe gesture based at least on a repeated sequence of capacitance changes over a set of conductive lines in the repeated crossover pattern. Also, the scalable gesture sensor is computationally simple, uses low power, and is uniquely scalable to cover a large area with few electrodes.

In aspects, a scalable gesture sensor integrated within an object to provide a touch-sensitive surface on the object is disclosed. The scalable gesture sensor includes a plurality of conductive lines and a controller coupled to the conductive lines. The conductive lines is disposed proximate to an exterior surface of the object. Further, the conductive lines are arranged such that a same two or more conductive lines of the plurality of conductive lines repeat a localized crossover pattern between one another across a portion of the exterior surface of the object to form a sensor grid having a plurality of repeated localized crossover patterns between the same two or more conductive lines. The controller is configured to detect touch input to one or more crossover points between the two or more conductive lines by detecting a change in capacitance to the one or more crossover points when a user's finger touches the one or more crossover points. In addition, the controller is configured to determine, based on detection of the touch input, a relative direction of touch input. Also, the controller is configured to process the touch input having the determined relative direction, to provide touch data usable to control a computing device or an application at the computing device.

In some implementations, the touch input is detected based on a change in capacitance measured on the two or more conductive lines when the user's finger touches the one or more crossover points.

In some implementations, the controller is coupled to a power source. In addition or as an alternative, in some of these implementations, the power source includes one or more photodiodes or solar cells integrated into the sensor grid.

In some implementations, the plurality of conductive lines include a first set of conductive lines and a second set of conductive lines that cross over the first set of conductive lines. Further, the first set of conductive lines forms multiple row groups and the second set of conductive lines forms multiple column groups. In addition or as an alternative, in some of these implementations, at least one row group of the multiple row groups has a first pitch that is different than a second pitch of at least one other row group of the multiple row groups. In addition or as an alternative, in some of these implementations, at least one row group of the multiple row groups is rotated two-dimensionally relative to at least one other row group of the multiple row groups.

In some implementations, the controller is configured to determine that the touch input includes changes in capacitance to a plurality of crossover points across multiple adjacent ones of the repeated localized pattern of crossover points over a duration of time, and determine the direction of the touch input relative to the sensor grid based on the touch input over the duration of time.

In some implementations, the touch input is detected based on a change in capacitance measured on the two or more conductive lines when the user's finger touches the one or more crossover points.

In some implementations, the controller is coupled to a power source. In addition or as an alternative, in some of these implementations, the power source comprises one or more photodiodes or solar cells integrated into the sensor grid.

In some implementations, the plurality of conductive lines include a first set of conductive lines and a second set of conductive lines that cross over the first set of conductive lines, the first set of conductive lines forms multiple row groups, and the second set of conductive lines forms multiple column groups. In addition or as an alternative, in some of these implementations, at least one row group of the multiple row groups has a first pitch that is different than a second pitch of at least one other row group of the multiple row groups. In addition or as an alternative, in some of these implementations, at least one row group of the multiple row groups is rotated two-dimensionally relative to at least one other row group of the multiple row groups.

In some implementations, the controller is further configured to determine that the touch input includes changes in capacitance to a plurality of crossover points across multiple adjacent ones of the repeated localized pattern of crossover points over a duration of time, and determine the direction of the touch input relative to the sensor grid based on the touch input over the duration of time.

In some implementations, the controller is coupled to a network interface configured to transmit the touch data to the computing device via a wireless network.

In some implementations, the plurality of conductive lines are arranged in one of a serpentine pattern or a spiraling pattern to form the plurality of repeated localized crossover patterns.

In some implementations, the plurality of conductive lines include conductive trace printed on an insulated multilayer material.

In some implementations, the object is wallpaper, carpet, or a laminate material.

In some implementations, the object is a garment, and the plurality of conductive lines are integrated into the garment via at least one of stitching, sewing, braiding, or embroidery. In addition or as an alternative, in some of these implementations, the plurality of conductive lines are insulated yarns. In addition or as an alternative, in some of these implementations, the wearable garment includes a sleeve with an elbow area, a wrist area, and a shoulder area; the plurality of conductive lines are integrated into the sleeve of the garment; the plurality of conductive lines are arranged with a first pitch in one or more of the wrist area and the elbow area to provide a first resolution of touch input detection; and the plurality of conductive lines are arranged with a second pitch in a first area between the wrist area and the elbow area that is greater than the first pitch to provide a second resolution of touch input detection that is lower than the first resolution.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor limit the scope of the claimed subject matter.

BRIEF DESCRIPTION OF THE DRAWINGS

The details of one or more aspects of a scalable gesture sensor for wearable and soft electronic devices are described below. The use of the same reference numbers in different instances in the description and the figures indicate similar elements.

DETAILED DESCRIPTION

Overview

This document describes techniques directed to a scalable gesture sensor for wearable and soft electronic devices. The gesture sensor described herein includes a number of touch points in a two-dimensional capacitive-touch-matrix sensor, which can be increased by laying a pattern of conductors such that there are multiple crossover points between two conductors, rather than a single crossover point. In this manner, the crossing-over of the two conductors is reused (e.g., repeated), resulting in multiple crossover points occurring at different locations across a sensing area of the gesture sensor. Although absolute XY positioning of a touch input may not be computed by the gesture sensor based on a single capacitance measurement read between two conductors, the gesture sensor can detect a relative direction of a touch input over a duration of time. Accordingly, using a gesture sensor having a local crossover pattern repeated (e.g., in a regular manner or an irregular manner) throughout the sensing area of the gesture sensor, the gesture sensor can detect the occurrence and relative direction of a swipe gesture at least based on a repeated sequence of capacitance changes over a set of conductive lines in the repeated crossover pattern.

The scalable gesture sensor described herein is computationally simple, uses low power, and is uniquely scalable to cover a large area with very few electrodes. In some aspects, the sensor includes electronic components that can be located at or near a corner of an interactive surface (e.g., touch-sensitive surface) created by the sensor or at a location different from the interactive surface. The sensor can be implemented in wearable electronic devices (e.g., clothing) and/or electronic devices embedded in a soft material (e.g., wallpaper, carpet, tabletop laminate). A soft material in this context indicates that the material can be easily deformed (e.g., by hand in one stage of the processing). The material may become harder in a later stage of processing, such as in a tabletop laminate. While corresponding rigid electronic components (e.g., battery, rigid connector(s), electronics) for the sensor are typically stiff, the electronic components can be located in a small, localized area so as to avoid adding stiffness to the entire interactive surface or an entire edge of the interactive surface.

Large-surface embedded systems, (e.g., touch sensors integrated in wallpaper, carpet, or tabletop laminates) have limited space for electronics and limited processing capabilities. For example, in an XY sensing matrix, it may be impractical and unscalable to place connections along the edges of a 30 meters (m) by 6 m (100 foot (ft) by 20 ft) interactive wall. The scalable gesture sensor described herein may be implemented in a large-scale touch sensitive surface that uses a small control board.

The scalability of the gesture sensor described herein is enabled based on repeating sensing geometry with sensing lines (e.g., conductive yarns or conductive trace). For example, a 0.6 m by 0.6 m (2 ft by 2 ft) wallpaper patch can be tiled together into an arbitrarily large surface and be controlled by a small 7.6 cm by 10 cm (3 inch by 4 inch) circuit board. In some aspects, the small circuit board may be hidden in an electrical socket, which may typically be incorporated into a large wall surface. In another example, a carpet square may have relatively stiff areas (e.g., glue patches) that have similar locations for such a small circuit board.

Some touch interactions (e.g., tap, swipe, scroll) do not need to support absolute positioning input. For these touch interactions, electrodes of the gesture sensor may be reused to provide robust detection of relative direction of a swipe gesture. Reusing electrodes enables the gesture sensor to cover an arbitrarily large touch area while using a far simpler architecture than in conventional systems that use a large number of electrodes. In this way, interactions (e.g., touch input) may be sensed anywhere on a sensing grid formed by the gesture sensor because the crossover pattern repeats along the grid's entire length and width.

Example Operating Environment and System

Figure 1:
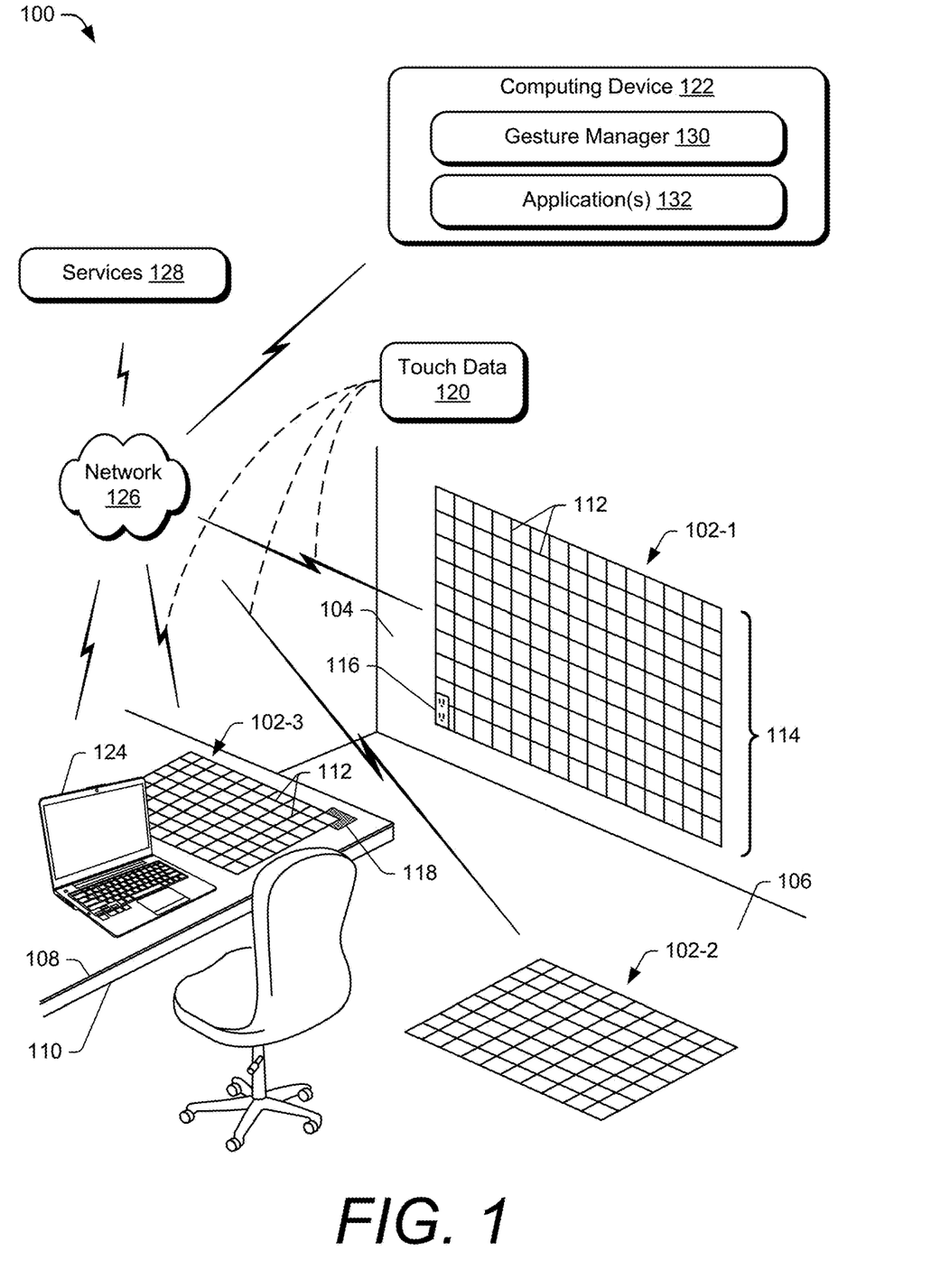
FIG. 1 illustrates an example environment in which aspects of a scalable gesture sensor for wearable and soft electronic devices is implemented.

FIG. 1 illustrates an example environment 100 in which aspects of a scalable gesture sensor for wearable and soft electronic devices is implemented. The example environment 100 includes a scalable gesture sensor 102, which can be integrated into various objects or surfaces to create a touch-sensitive surface. In a first instance 102-1, the scalable gesture sensor 102 is integrated into wallpaper 104, which is illustrated in this example as installed on a wall. In a second instance 102-2, the scalable gesture sensor 102 is integrated into flooring material 106 (e.g., carpet), which is illustrated in this example as installed on the floor. In a third instance 102-3, the scalable gesture sensor 102 is integrated into a cover material 108 (e.g., a laminate material), which is illustrated in this example as being located on a table 110 or desk.

The scalable gesture sensor 102 is formed by a plurality of electrodes (e.g., sensing lines 112), which form a sensor grid 114 having a pattern of crossover points that is repeated (e.g., regularly repeated to form an array of instances of the pattern, repeated without symmetry) throughout the sensor grid 114 using the same sensing lines 112, resulting in the same two sensing lines forming multiple intersections with one another. For example, the first instance 102-1 represents a large-scale gesture sensor having few sensing lines (e.g., 2, 3, 4, 5, 6), which are arranged to repeat the same localized crossover pattern such that two sensing lines cross over each other multiple times, resulting in multiple crossover points between the same two sensing lines. Corresponding electronic components, however, may be located proximate to an edge or a corner of the gesture sensor 102. For example, electronic components corresponding to the first instance 102-1 of the gesture sensor 102 may be located in an electrical socket 116 integrated into the wall, such that the electronic components are hidden from a user's view.

Similarly, in the second instance 102-2 of the gesture sensor 102, associated electronic components may be located in an electrical socket integrated into the floor. In another example, the electronic components may be located proximate to an edge of the floor (e.g., near the wall) or at a location corresponding to a glue patch of the carpet. In this way, electronic components are not used along an entire side of the gesture sensor 102, as in many conventional touch sensors. Rather, the electronic components are connected to the sensing lines of a single localized crossover pattern of the gesture sensor 102. One example is illustrated in the third instance 102-3 of the gesture sensor, which includes a small, localized area 118 representing the electronic components connected to the sensing lines 112 of the gesture sensor 102.

The electronic components may be connected to a controller configured to read signals on the sensing lines to detect touch input by detecting a change in capacitance measured on one or more of the sensing lines 112. Also, the controller may be connected to a network transmitter to transmit information (e.g., touch data 120 determined from the touch input) to a computing device 122 (e.g., laptop 124) over a wireless network 126 to control a function of the computing device 122 or one or more online services 128. In an example, the computing device 122 includes a gestures manager 130 configured to determine a gesture from the transmitted touch data 120 and, based on the determined gesture, control the computing device 122 or one or more applications 132 of the computing device 122.

These and other capabilities and configurations, as well as ways in which entities of FIG. 1 act and interact, are set forth in greater detail below. These entities may be further divided, combined, and so on. The environment 100 of FIG. 1 and the detailed illustrations of FIG. 2 to FIG. 8 illustrate some of many possible environments and devices capable of employing the described techniques. FIGS. 3 to 8 describe additional details and features of the scalable gesture sensor 102. In FIGS. 3 to 8, the scalable gesture sensor 102 is described in the context of an object, but as noted above, the applicability of the features and advantages of the described systems and techniques are not necessarily so limited, and other embodiments involving other types of objects and electronic devices may also be within the scope of the present teachings.

Figure 2:
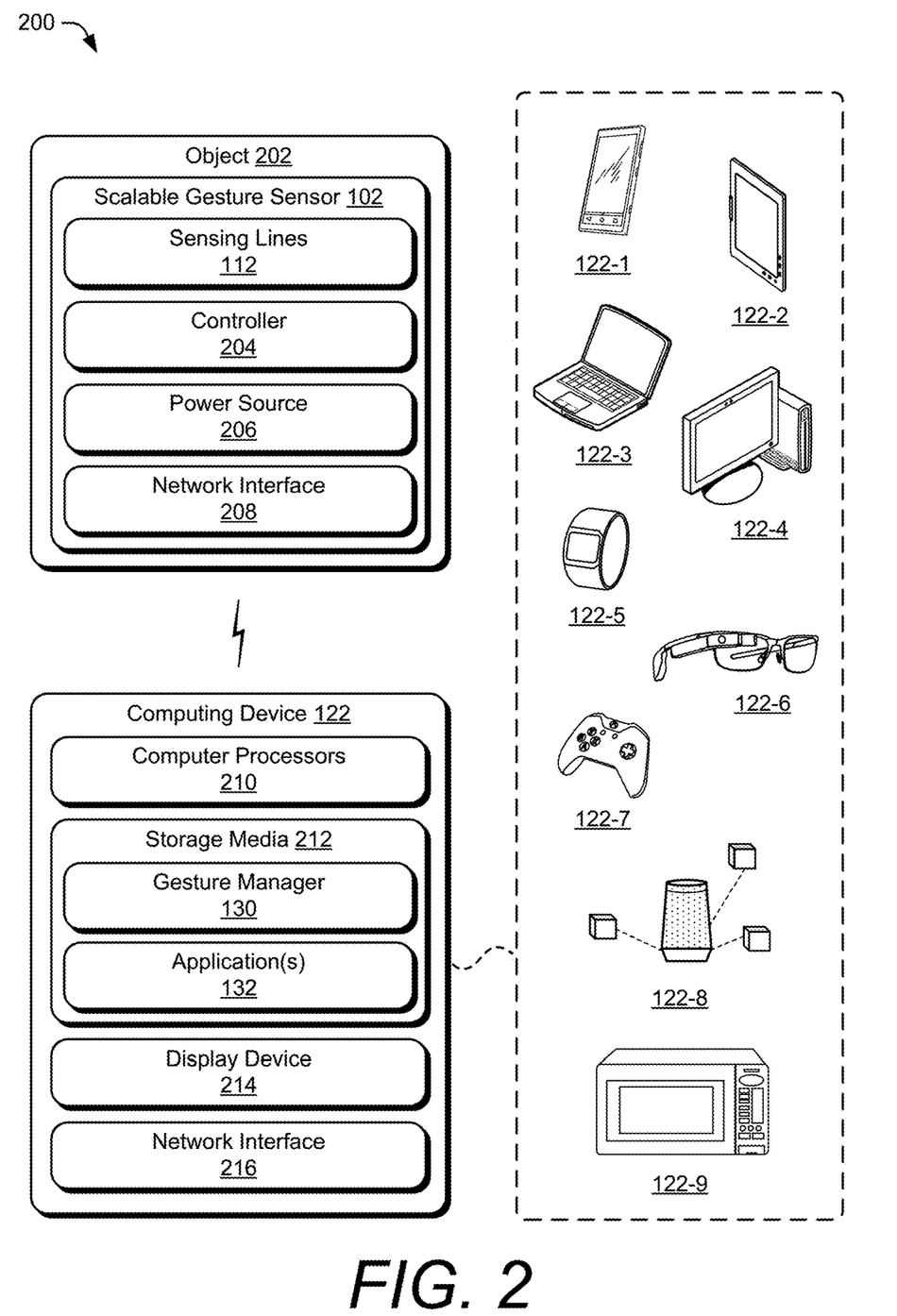
FIG. 2 illustrates an example system that includes an object and a scalable gesture sensor.

In more detail, consider FIG. 2, which illustrates an example system 200 that includes an object and a scalable gesture sensor. In the system 200, the scalable gesture sensor 102 is integrated into an object (e.g., object 202), which may be implemented as a flexible object, such as a wearable electronic garment (e.g., shirt, jacket) or a substantially planar material (e.g., wallpaper, carpet, laminate).

The scalable gesture sensor 102 is configured to sense touch input from a user when one or more fingers touch one or more of the sensing lines 112 of the scalable gesture sensor 102. In aspects, the scalable gesture sensor 102 may also be configured to sense full-hand touch input, such as when a user's palm or entire hand touches or swipes one or more of the sensing lines 112. Further, the scalable gesture sensor 102 may be configured to sense touch input by one or more feet of the user, whether a portion of the foot or the entire foot, such as when the scalable gesture sensor 102 is integrated into the carpet. To enable this functionality, the scalable gesture sensor 102 includes capacitive sensing lines (e.g., the sensing lines 112), a controller 204, and a power source 206. To enable communication with a computing device (e.g., the computing device 122) over a network (e.g., the network 126), the scalable gesture sensor 102 may also include, or be coupled to, a network interface 208.

The scalable gesture sensor 102 is configured to sense touch input when an object, such as the user's finger, hand, foot, or other object (e.g., stylus), approaches or makes contact with one or more of the sensing lines 112. Unlike conventional hard touch pads, the scalable gesture sensor 102 uses flexible sensing lines 112, which may include conductive thread, copper trace on a flexible substrate, etc. to sense the touch input. Thus, the sensing lines 112 of the scalable gesture sensor 102 do not alter the flexibility of the object 202, which enables easy integration within the object 202.

In an example, the sensing lines 112 may be conductive trace implemented (e.g., printed) on insulated multilayer materials, including a flexible printed circuit board (PCB). The conductive traces may be printed using any suitable printing technique, including screen printing, conductive inkjet technology, or hand-drawn. For large surfaces, such as wallpaper, existing roll-to-roll printing processes can be used to create such multilayer materials. In aspects, existing PCB technologies, which allow low-cost multilayer printing, may be used to create the multilayer materials. These example printing techniques enable the conductive traces to be electrically insulated from one another.

In another example, the sensing lines 112 may be conductive yarn, which has a conductive core for its electrical capabilities and is surrounded by an insulating material (e.g., interlocking fibers for textile qualities). Conductive yarns can be constructed and designed using various techniques that affect manufacturability, robustness, and flexibility. Conductive yarns can be used in combination with textile yarns (e.g., in a woven structure) as long as their physical properties' yarns influence on the woven structure, such as thickness and abrasion tolerance, is considered. The sensing lines 112 may be used to create a textile sensor (e.g., the scalable gesture sensor 102) using a wide array of existing methods leveraging a manual process, semi-automatic machines (e.g., user-operated machines), or fully-automated machines (e.g., textile manufacturing techniques for cloth or carpet). The sensor may thus be fabricated through stitching, sewing, braiding, or embroidery of insulated conductive yarns or conductive threads. Using fewer connection points (e.g., interfaces between hard connectors and soft material of the conductive yarn and garment) results in fewer areas that are connected to rigid electronics, use of smaller connectors, and a smaller area to be secured against failures.

The controller 204 is implemented with circuitry that supports both self and mutual capacitive sensing. For example, the circuitry of the controller 204 may be configured to detect a change in capacitance of one or more of the sensing lines 112 to detect a touch input. In aspects, the circuitry of the controller 204 is configured to detect a touch input at an intersection (crossover point) between two of the sensing lines 112. The controller 204 uses the touch input to determine various gestures, such as a touch (e.g., touch, tap, and hold) and a swipe (e.g., swipe up, swipe down, swipe left, swipe right).

The controller 204 may perform phase tracking of the touch input to determine a relative direction of the touch input. For instance, the controller 204 may track time-varying sinusoidal signals across vertical and horizontal axes of the sensor grid 114 to sense continuous fine-grain relative motion of the touch input at high speeds. When a user touches a first sensing line, a corresponding signal (e.g., capacitance) on that line varies. As the user moves their finger across the sensor grid 114, their finger moves away from the first sensing line and touches a second, adjacent sensing line, which causes a corresponding signal on that second sensing line to vary. This signal pattern continues as the user's finger moves to the next sensing line. Using the scalable gesture sensor 102 described herein, which utilizes repeated crossover patterns by the same sensing lines (three sensing lines in this particular example), when the user's finger continues moving in the same direction and moves onto a second instance of the crossover pattern, the signal on the first sensing line again varies. This signal pattern enables the controller 204 to track the relative direction of motion of the user's finger by, for example, tracking the phase of the signal. Because the signal is continuous, a smooth interpolation across the signal is achievable. Then, the controller 204 may normalize the signal over the crossover pattern and determine the relative direction of the touch input.

In another example, the controller 204 may collect the signals and determine the gesture based on a trained set of gestures (e.g., flicks, swipes, taps, pats). In some aspects, the controller 204 may transmit the signals to a machine learning system (e.g., a support vector machine (SVM)) to train the system to recognize various gestures, including more complex discrete gestures. Typical SVMs are compatible with continuous tracking techniques, such as the phase tracking technique described above, and may operate with a relatively small amount of training data.

In yet another example, the controller 204 may utilized on-chip hardware-accelerated motion tracking techniques to determine the gesture and/or the relative direction of the gesture. An optical flow can be used to track frame-to-frame motion across a low-resolution crossover pattern. Such capabilities exist in low-power integrated circuits, which were developed for optical mouse sensors and more recently have been leveraged for high-speed motion sensing and high-speed material classification. In an example, a low resolution image (e.g., 4×4, 10×10) may be fed directly into an optical flow engine implemented in hardware. The low resolution image may be obtained by one or more photodiodes implemented in the sensor grid 114. Then, using an output of the optical flow engine, relative translation can be determined.

In yet another example, the controller 204 may utilize neural networks to learn features and device-dependent calibration. For example, precompiled models may be deployed to microcontrollers and/or miniaturized sensors for directional swipe detection. Because the neural networks may require a larger amount of data than the SVMs, the neural networks may be used with the SVMs for increased accuracy and efficiency.

The power source 206 is coupled to the controller 204 to provide power to the controller 204. The power source 206 may be implemented as a small battery or a direct current source. The controller 204 is also coupled to the scalable gesture sensor 102. For example, the sensing lines 112 may be connected to the controller 204 using flexible PCB, creping, gluing with conductive glue, soldering, and so forth. The power source 206 may provide electrical power on the order of microwatts or sub-microwatts (e.g., 500 nanowatts).

For large surfaces that have access to a dedicated electrical power source, such as an electrical outlet in a wall-papered wall of a room, the sensing lines 112 of the sensor grid 114 implemented in the wallpaper may meet at a control board embedded in the electrical outlet, resulting in a straightforward way to power the circuitry of the scalable gesture sensor 102. As shown in FIG. 1, the sensing lines form patterns that enable a small patch (e.g., 20 millimeters (mm) by 20 mm) to be extended to a large area (e.g., three meters by four meters) with a small area of connection points.

However, for large surfaces without easy access to electrical power, using the scalable gesture sensor 102 described herein enables the use of significantly less power than an equivalent conventional XY sensing matrix (e.g., 4×4=16 sensing combinations versus 10,000×10,000=100,000,000 sensing combinations) or reflectometry methods. Accordingly, in some aspects, the scalable gesture sensor 102 may be self-powered, by using the power source 206 integrated with the scalable gesture sensor 102. For example, the power source 206 of the scalable gesture sensor 102 may be solar cells or photodiodes, either printed on the object's exterior surface (e.g., using organic synthesis techniques) or embedded in the object's exterior surface (e.g., using small semiconductors), which may harvest a sufficient amount of energy from certain ambient lighting conditions (e.g., office lighting conditions) for the scalable gesture sensor 102 to perform the sensing and generate backscatter radio to send information back to a central system (e.g., the computing device 122 or services 128). Such techniques enable large-scale, inexpensive printing of a sensing surface, enabling substantially the entire wall to become a touch-sensitive surface. Similar techniques can be used for weaving carpets with the scalable gesture sensor 102 to enable touch-sensitive functionality.

Accordingly, because the scalable gesture sensor 102 uses a repeated crossover pattern with the same few sensing lines that provide a relatively low number of sensing combinations (e.g., 16 combinations instead of thousands or millions), the scalable gesture sensor 102 can operate using very low power, which may be provided by the power source 206 (e.g., photodiodes, solar cell, battery) as described herein and integrated into the scalable gesture sensor 102, resulting in a self-powering, low-power, low-complexity, microcontroller-friendly, touch-sensitive surface of an object.

The object 202 may include one or more network interfaces (e.g., the network interface 208) communicatively coupled to the scalable gesture sensor 102 or integrated with the scalable gesture sensor 102. The network interface(s) 208 are configured to communicate data, including touch data, over wired, wireless, or optical networks to the computing device 122. By way of example and not limitation, the network interface(s) 208 may communicate data (e.g., the touch data 120 from FIG. 1) over the network 126 (from FIG. 1), which may be a local-area-network (LAN), a wireless local-area-network (WLAN), a personal-area-network (PAN) (e.g., Bluetooth™), a wide-area-network (WAN), an intranet, the Internet, a peer-to-peer network, point-to-point network, a mesh network, and the like.

The scalable gesture sensor 102 enables a user to control the object 202 that the scalable gesture sensor 102 is integrated with, or to control a variety of other computing devices 122 via the network 126. The computing devices 122 are illustrated with various non-limiting example devices: a smart phone 122-1, a tablet 122-2, a laptop 122-3, a desktop computer 122-4, a computing wristwatch 122-5 (e.g., smartwatch), computing spectacles 122-6, a game controller 122-7, a virtual-assistant device 122-8, a home appliance 122-9, and so forth. Any other device may also be used, such as home automation and control systems, sound or entertainment systems, home appliances, security systems, netbooks, and e-readers. Note that the computing device can be wearable (e.g., computing spectacles and smart watches), non-wearable but mobile (e.g., laptop, tablet), or relatively immobile (e.g., desktop computer, home appliance).

In this example, the computing device 122 includes one or more computer processors 210 and computer-readable storage media (storage media) 212. The storage media 212 includes applications (e.g., the applications 132) and/or an operating system (not shown) embodied as computer-readable instructions executable by the computer processors 210 to provide, in some instances, functionalities described herein. The storage media 212 also includes the gesture manager 130, which is described below in further detail.

The computing device 122 may also include a display device 214 and one or more network interfaces 216 for communicating data over wired, wireless, or optical networks. For example, the network interfaces 216 can receive touch data, sensed by the scalable gesture sensor 102, via the network interface(s) 208 of the scalable gesture sensor 102. By way of example and not limitation, the network interface 216 may communicate data over a LAN, a WLAN, a PAN, a WAN, an intranet, the Internet, a peer-to-peer network, point-to-point network, a mesh network, and the like.

The gesture manager 130 is configured to interact with the applications 132 and the scalable gesture sensor 102 effective to activate various functionalities associated with the computing device 122 and/or the applications 132 through touch input (e.g., gestures) received and detected by the scalable gesture sensor 102. In some aspects, the gesture manager 130 receives raw touch data (e.g., the touch data 120 in FIG. 1) from the scalable gesture sensor 102 at the object 202 and determines the gesture by processing the raw touch data using one or more of the techniques described above. For example, the gesture manager 130 may perform phase tracking on the raw touch data, utilize machine learning to train the system to recognize a discrete gesture among a set of trained gestures, recognize a discrete gesture among a set of previously trained gestures, process the raw touch data in an optical flow to track relative translation, or utilize neural networks to determine the gesture based on precompiled models.

Figure 3:
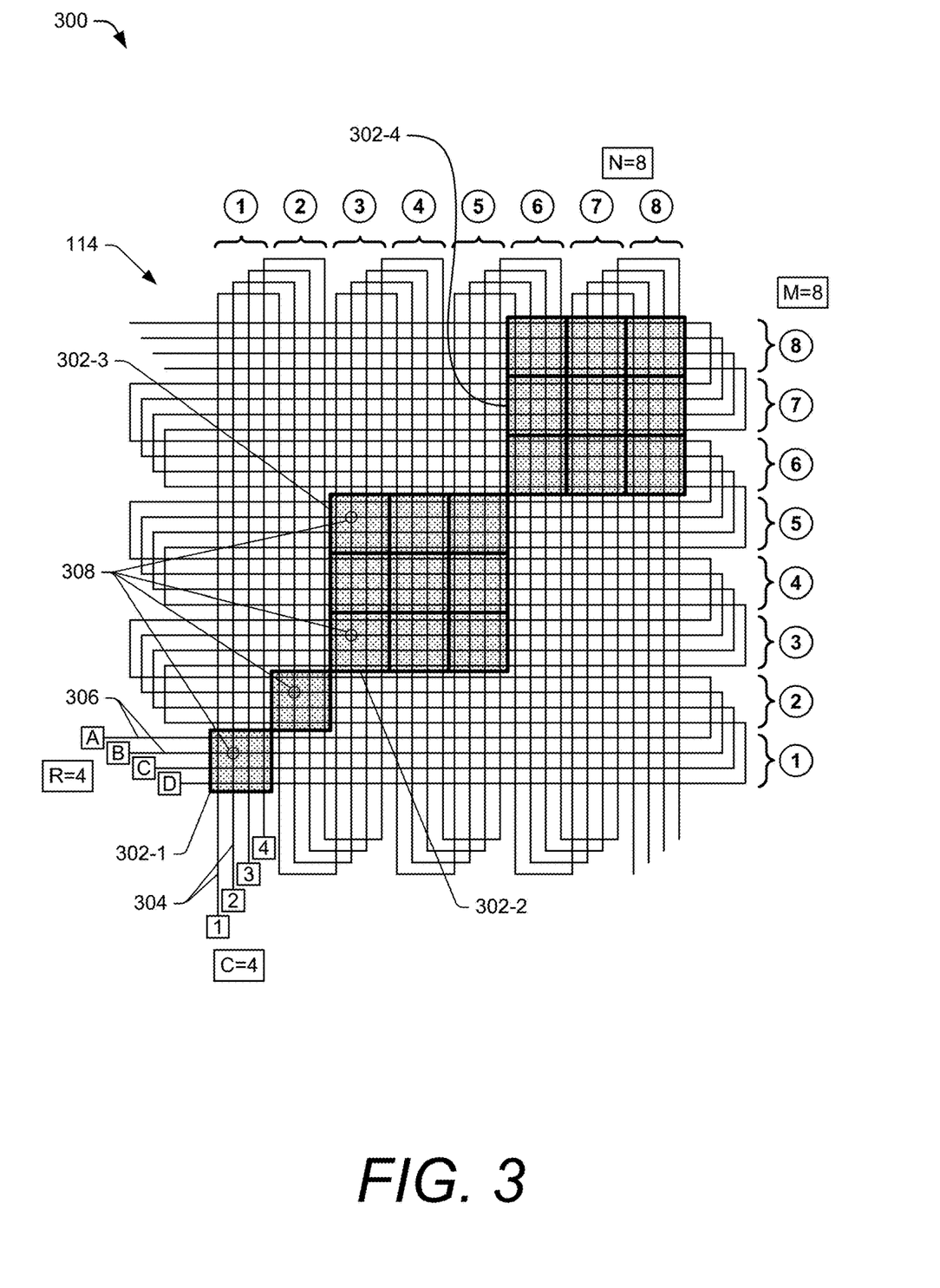
FIG. 3 illustrates an example implementation of a sensor grid formed by the scalable gesture sensor from FIG. 1.

FIG. 3 illustrates an example implementation 300 of a sensor grid (e.g., the sensor grid 114) formed by the scalable gesture sensor 102 from FIG. 1. In this example, the scalable gesture sensor 102 is arranged in a greatly repeatable touch matrix 302, which includes only four vertical electrodes 304 (e.g., lines 1, 2, 3, and 4) and four horizontal electrodes 306 (e.g., lines A, B, C, and D) forming the sensor grid 114. For purposes of illustration, several instances of the repeatable touch matrix 302 are highlighted throughout the sensor grid 114, including instances 302-1, 302-2, 302-3, and 302-4, and so forth. However, the highlighted instances are not intended to be limiting. Rather, the highlighted instances are intended to illustrate examples a various different instances of the same touch matrix 302 throughout the sensor grid. Non-highlighted areas of the sensor grid 114 also include instances of the repeatable touch matrix 302. As such, the highlighted areas of the sensor grid 114 in FIG. 3 are not different than the non-highlighted areas of the sensor grid 114. The sensor grid 114 is not an absolute touch matrix capable of detecting absolute positioning of a touch input but the example sensor grid 114 is a large matrix having the same 4×4 repeated submatrix (e.g., the touch matrix 302). Although the example touch matrix 302 is illustrated as a 4×4 structure, the touch matrix 302 may be implemented as any suitable arrangement of rows and columns of sensing lines, including 3×3, 5×5, 5×3, 4×5, and so forth. Further, although the example touch matrix 302 and corresponding sensor grid 114 are illustrated as rectilinear, the repeatable touch matrix and corresponding sensor grid may have other arrangements, some examples of which are described in detail below. The rows and columns of the sensing lines 112 are collected into one corner of the large sensor grid and are connected to the electronic components (e.g., rigid connector(s), battery, circuitry of the controller 204 in FIG. 2).

The repeatable touch matrix 302 illustrated in FIG. 3 is replicated a number of times by the same eight electrodes. For example, a vertical electrode 304 (e.g., line B) is run back and forth vertically in a spiraling pattern or serpentine pattern. Likewise, a horizontal electrode 306 (e.g., line 2) is run back and forth horizontally in a spiraling pattern or a serpentine pattern. In this way, the line B and line 2 cross over each other multiple times throughout the sensor grid 114, as illustrated by crossover points 308. Notice that in this example, the various instances of the repeatable touch matrix 302 have the same orientation. Also, the vertical electrodes 304 may be equidistant from one another, and the horizontal electrodes 306 may be equidistant from one another, such that the pitch between lines is consistent and uniform throughout the sensor grid 114.

In other aspects, the electrodes used in the sensor grid 114 may not be equidistant from one another. For example, the pitch between two adjacent sensor lines may vary. In another example, the pitch between a first pair of sensing lines may be different than the pitch between a second pair of sensing lines. Also, a first instance of the repeatable touch matrix 302 may have a different orientation relative to a second instance of the repeatable touch matrix 302. Different pitches and orientations may be beneficial when implemented into an object that is non-planar (e.g., a sleeve of a jacket). A denser pitch (e.g., smaller width between adjacent lines) may be used for higher resolution of touch detection whereas a less-dense pitch (e.g., greater width between adjacent lines) may be used for lower resolution detection. Further examples and details of this and other aspects are described below.

In aspects, the sensor grid 114 of the scalable gesture sensor 102 is a repeated touch matrix, (R×M)+(N×C), of serpentine sensor lines (e.g., traces, conductive yarns) that overlap and intersect at specific intervals, where the term R represents a number of rows (each row being a single sensing line 112) in a row group, the term M refers to a number of row groups, the term N represents a number of columns (each column being a single sensing line 112) in a column group, and the term C refers to the number of column groups. As mentioned, the arrangement can vary in size and shape to accommodate specific application requirements.

One example arrangement is the sensor grid 114 illustrated in FIG. 3, which is defined as [eight row groups (M) of four rows (R)]×[eight column groups (C) of four columns (N)]. This arrangement yields M×N=64 smaller touch matrices with electrically (e.g., capacitively) shared touch points. Thus, although the sensor grid 114 is illustrated with 1,024 touch points (e.g., intersections), only R×C=4×4=16 touch points are unique. In this way, eight serpentine electrodes are used to cover the same size area that might require 128 electrodes of a conventional touch sensor. Given this quadratic relationship, the scalable gesture sensor 102 described herein may improve the coverage area by M×N, or 64 in this example, in comparison to conventional touch sensors that use a different electrode for each row and column. Accordingly, the scalable gesture sensor 102 may include any number of R×C touch matrices repeated across a two-dimensional sensor grid.

Figure 4:
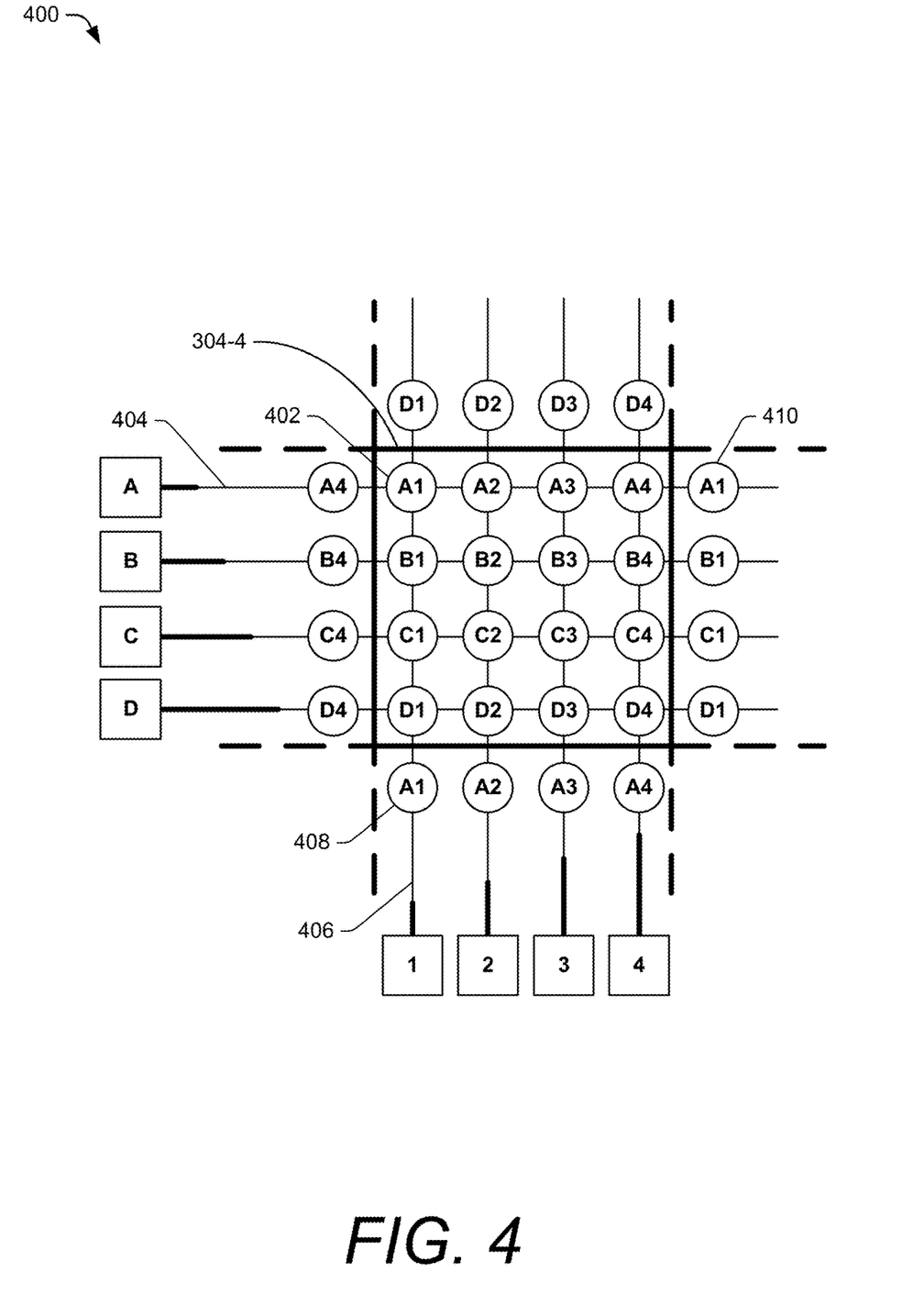
FIG. 4 illustrates an enlarged view of an instance of the repeatable touch matrix in FIG. 3.

FIG. 4 illustrates an enlarged view 400 of the instance 302-4 of the repeatable touch matrix 302 in FIG. 3. Notice that the touch points within the touch matrix 302 are repeated in locations neighboring the touch matrix 302. For instance, touch point A1 in the top left corner (e.g., location 402) of the touch matrix is repeated by the same two sensing lines (e.g., line-A 404 and line-1 406) in locations (e.g., location 408 and location 410) corresponding to the top left corner of neighboring touch matrices. The other touchpoints are similarly repeated. As further illustrated, the same columns and rows of electrodes are used to form the repeating touchpoints.

Figure 5:
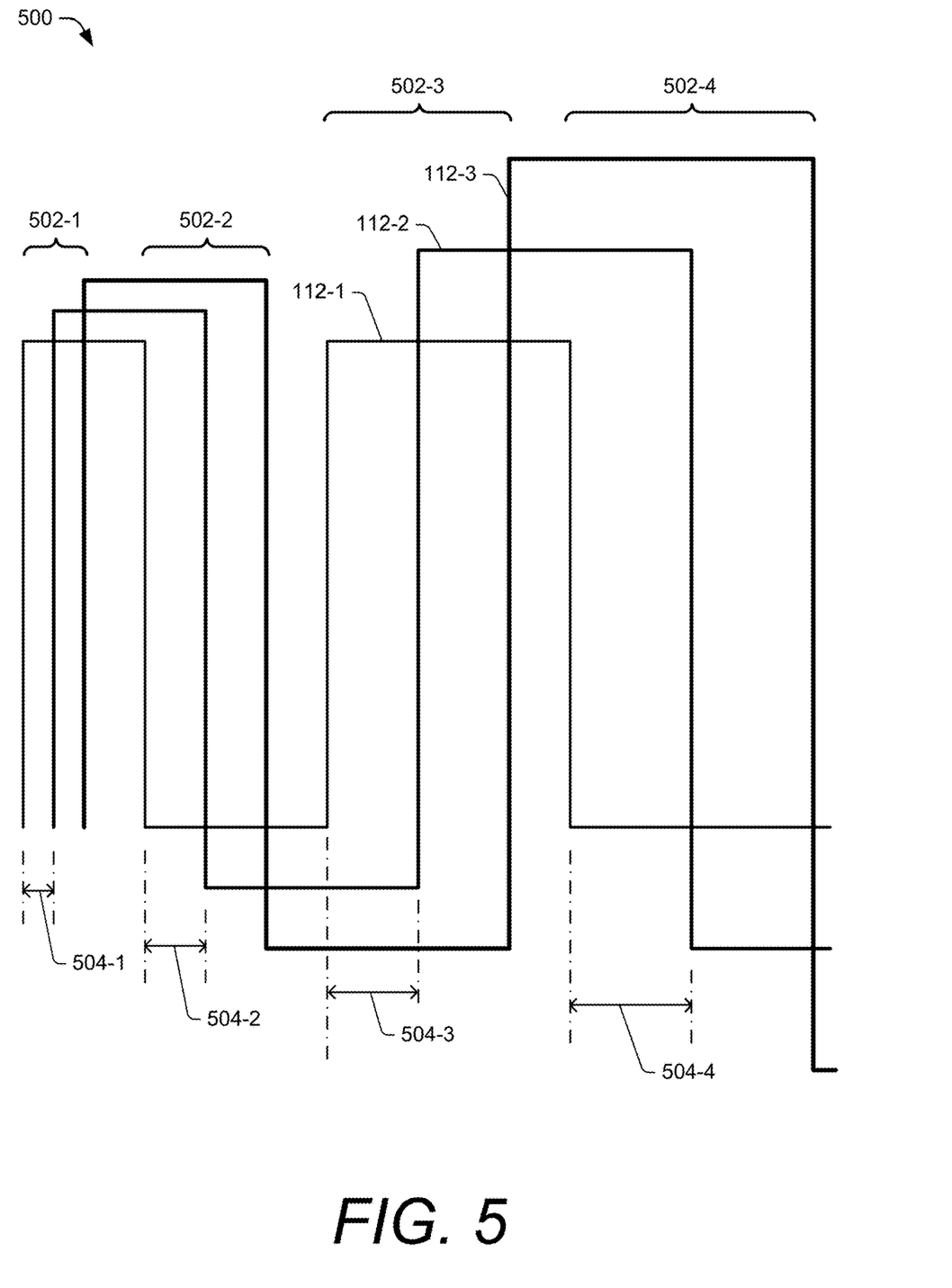
FIG. 5 illustrates an example arrangement of a first set of sensing lines of the scalable gesture sensor having a varying pitch.
Figure 6:
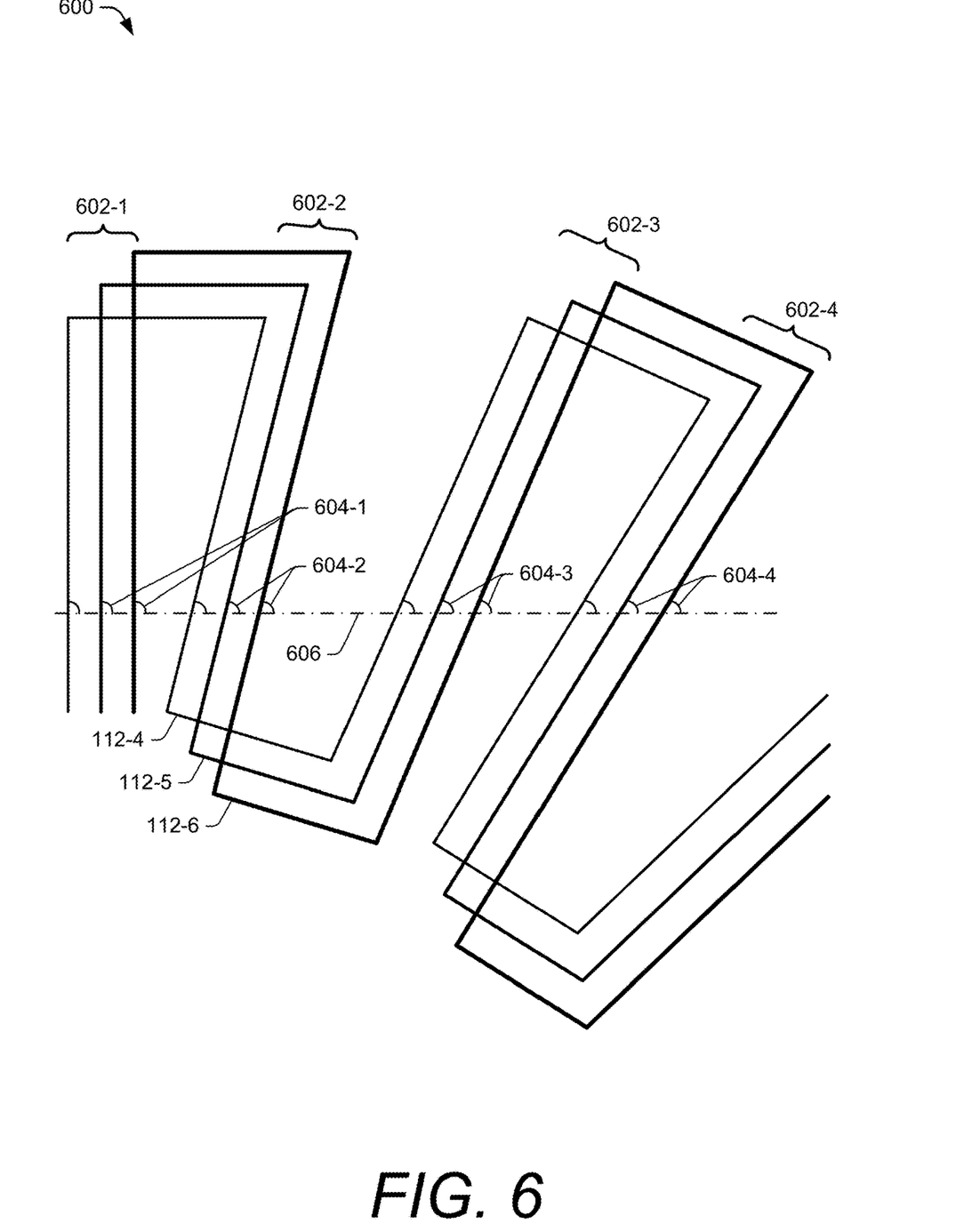
FIG. 6 illustrates an example arrangement of a second set of sensing lines of the scalable gesture sensor having a two-dimensional rotation between column groups.
Figure 7:
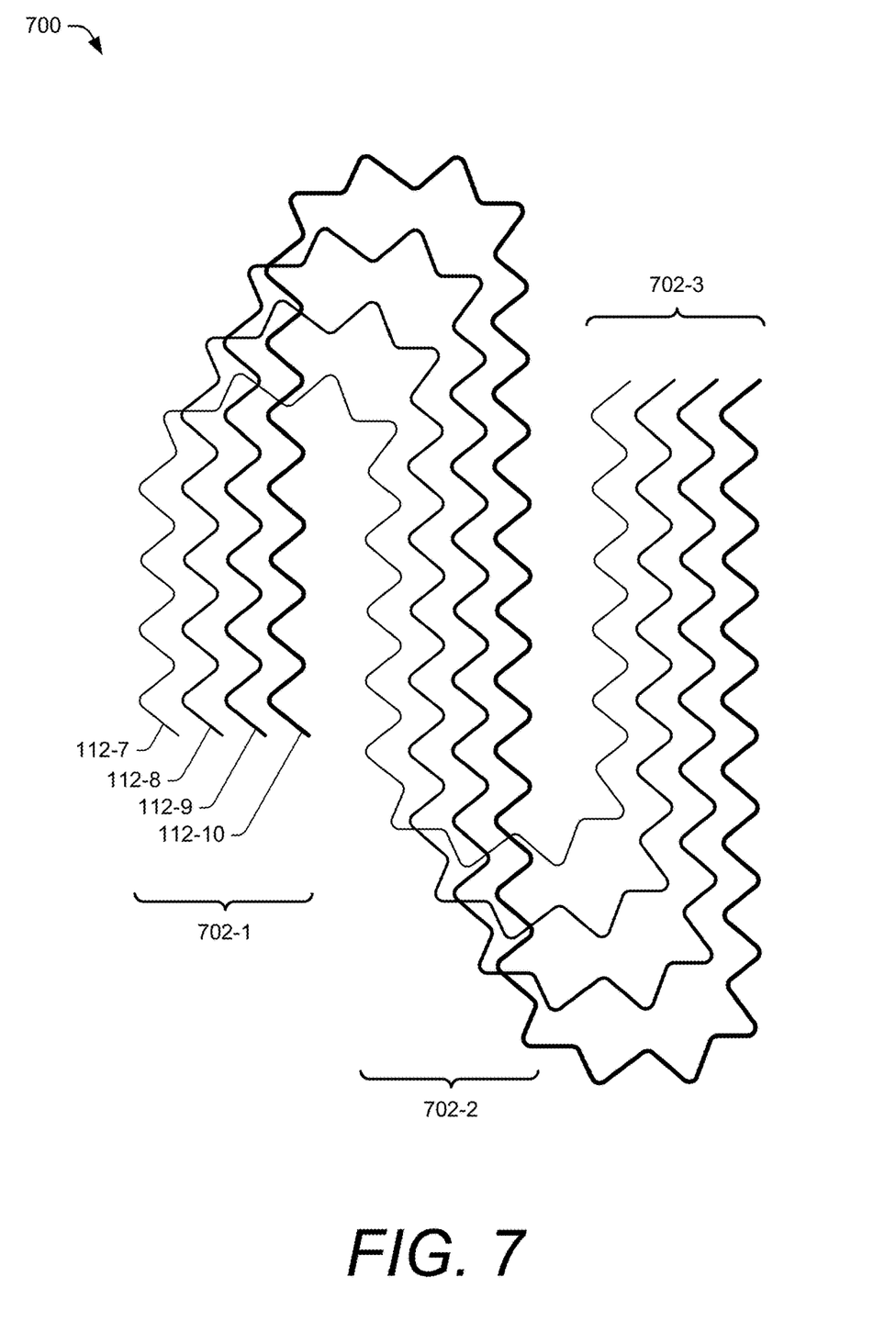
FIG. 7 illustrates an example arrangement of a third set of sensing lines of the scalable gesture sensor forming non-linear columns.

FIGS. 5 to 7 illustrate different arrangements of sensing lines that are usable to create the scalable gesture sensor described herein. For purposes of simplicity, only one set of sensing lines (e.g., vertical electrodes forming column groups) are illustrated. Accordingly, a sensor grid can be created by integrating a second set of sensing lines (e.g., horizontal electrodes forming row groups) that create crossover points with the first set of sensing lines.

FIG. 5 illustrates an example arrangement 500 of a first set of sensing lines of the scalable gesture sensor having a varying pitch. The pitch refers to a width between adjacent sensing lines. In an example, the example arrangement 500 is illustrated with three sensing lines 112 (e.g., sensing lines 112-1, 112-2, and 112-3) forming column groups 502 including a first column group 502-1, a second column group 502-2, a third column group 502-3, and fourth column group 502-4. Each of the column groups 502 may have a different pitch 504 relative to at least one other column group 502. These pitches 504 are illustrated as gradually increasing from left to right. Alternatively, the pitches 504 may gradually decrease from left to right. In yet another example, the pitch 504 may increase and decrease from column to column by varying factors. In FIG. 5, the first column group 502-1 has a first pitch 504-1, the second column group 502-2 has a second pitch 504-2 that is greater than the first pitch 504-1. Further, the third column group 502-3 has a third pitch 504-3 that is greater than the second pitch 504-2 and the fourth column group 502-4 has a fourth pitch 504-4 that is greater than the third pitch 504-3. The pitch 504 may change (increase or decrease) by any suitable amount or factor (e.g., a linear scale, a semi-log scale, a logarithmic scale). Similar layouts may be used in row groups that cross over the column groups 502 to form the sensor grid 114 of the scalable gesture sensor 102.

FIG. 6 illustrates an example arrangement 600 of a second set of sensing lines of the scalable gesture sensor having a two-dimensional rotation between column groups. For example, the example arrangement 600 is illustrated with three sensing lines 112 (e.g., sensing lines 112-4, 112-5, and 112-6) forming column groups 602 (e.g., a first column group 602-1, a second column group 602-2, a third column group 602-3, and a fourth column group 602-4). As illustrated, the column groups 602 are not parallel with one another. Rather, each column group 602 is rotated clockwise or counterclockwise relative to an adjacent column group 602. Further, each column group 602 forms a different angle 604 relative to a horizontal reference line 606. For example, a first angle 604-1 between the first column group 602 of the sensing lines 112 and the horizontal reference line 606 is substantially orthogonal, a second angle 604-2 between the second column group 602 of the sensing lines 112 and the horizontal reference line 606 is smaller than the first angle 604-1, a third angle 604-3 between the third column group 602 of the sensing lines 112 and the horizontal reference line 606 is smaller than the second angle 604-2, and a fourth angle 604-4 between the fourth column group 602 of the sensing lines 112 and the horizontal reference line 606 is smaller than the third angle 604-3. The amount of rotation (e.g., change in the angle 604) from one column group 602 to the next column group may be any suitable amount and may depend on the geometry of the object's surface in which the sensor grid is integrated. Similar layouts may be used in row groups that cross over the column groups 602 to form the sensor grid 114 of the scalable gesture sensor 102.

FIG. 7 illustrates an example arrangement 700 of a third set of sensing lines of the scalable gesture sensor forming non-linear columns. This example arrangement illustrates sensing lines 112 (e.g., sensing lines 112-7, 112-8, 112-9, and 112-10) laid out in a non-linear manner in each column group 702 (e.g., a first column group 702-1, a second column group 702-2, and a third column group 702-3). For example, the sensing lines 112 are laid out in a wave pattern and the sensing lines 112 in a single column group 702 are parallel to one another within the column group 702. Similar layouts may be used in row groups that cross over the column groups 702 to form the sensor grid 114 of the scalable gesture sensor 102. Accordingly, the sensing lines 112 can be laid out in any suitable arrangement to form a repeated localized crossover pattern (e.g., the repeatable touch matrix 302 of FIG. 3 or other crossover pattern) across the sensor grid.

Although not shown, another example arrangement of the sensing lines may include concentric rings formed by the sensing lines, where the pitch increases from a center ring toward an outermost ring. In this way, the sensor grid may have an arrangement similar to an archery target. In aspects, the smaller rings near the center of the sensor grid have a smaller pitch than the outer rings and provide higher sensitivity for touch input detection. The larger rings near an outer edge of the sensor grid have a greater pitch than the smaller rings and provide a lower sensitivity for touch input detection. In an example, the center of the concentric-ring arrangement may be located at an elbow area of a garment sleeve. In another example, the center of the concentric-ring arrangement may be located at a wrist area of a garment sleeve.

The scalable gesture sensor 102 described herein may be implemented using any combination of the various example arrangements described with respect to FIGS. 3 to 7 and the scalable gesture sensor 102 is not limited to any one implementation individually. The examples described herein can be combined in any suitable manner to create a scalable gesture sensor having a repeated localized crossover pattern across the sensor grid. Accordingly, the sensor grid may be formed by column groups and row groups that are at least partially rectilinear, warped, slanted, and/or skewed in different ways.

Figure 8:
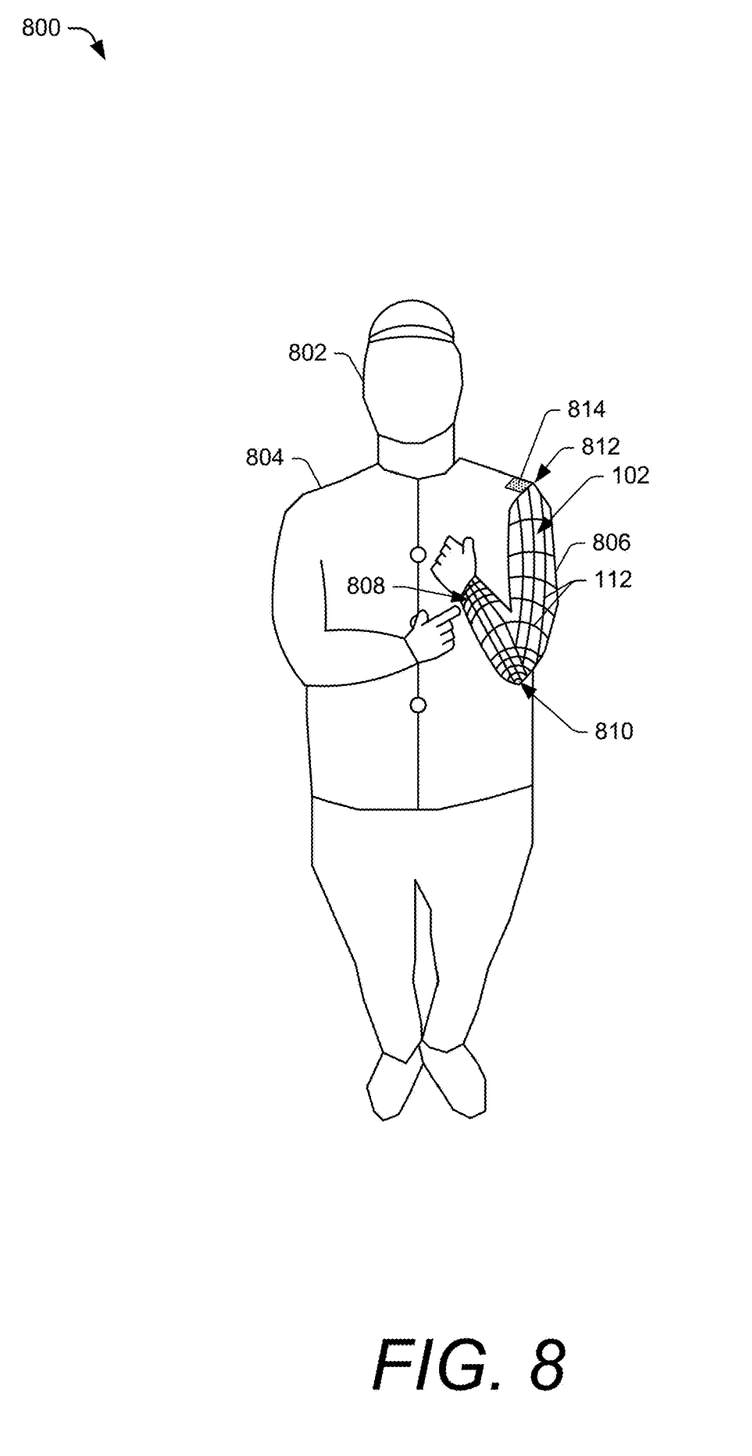
FIG. 8 illustrates an example implementation in which the scalable gesture sensor from FIG. 1 is integrated into a garment.

FIG. 8 illustrates an example implementation 800 in which the scalable gesture sensor from FIG. 1 is integrated into a garment. For example, a user 802 is illustrated wearing a garment 804 (e.g., jacket) having integrated wearable technology (e.g., the scalable gesture sensor 102). The scalable gesture sensor 102 is integrated into a sleeve 806 of the garment 804 to enable the sleeve 806 to be touch sensitive. The sensing lines 112 of the scalable gesture sensor 102 are arranged in a repeated crossover pattern with multiple crossover points occurring between the same two sensing lines. The sensing lines 112 are arranged to have a denser pitch (e.g., smaller width between adjacent sensing lines) in areas corresponding to the user's wrist 808 and/or elbow 810 and coarser pitch (e.g., greater width between adjacent sensing lines) in other areas of the sleeve, including on or around the forearm (between the wrist 808 and the elbow 810), on a shoulder 812, and upper arm (between the shoulder 812 and the elbow 810). Using the techniques described herein, the few sensing lines 112 used in the scalable gesture sensor 102 are connected to electronic components (e.g., rigid connector(s), electronics, battery) in a small, localized area that is more tolerable to user's to have some stiffness or rigidity, such as in a portion of the shoulder area (e.g., area 814) or the upper area of the sleeve 806 proximate to the shoulder 812. In this way, the garment 804 is integrated with a low-power, scalable gesture sensor that enables touch-sensitivity to a large area of the garment 804, such as the entire sleeve 806, using only a few electrodes and corresponding connectors operable to detect touch gestures and relative direction of swipe gestures.

Although techniques using and apparatuses for a scalable gesture sensor for wearable and soft electronic devices are described, it is to be understood that the subject of the appended claims is not necessarily limited to the specific features or methods described. Rather, the specific features and methods are disclosed as example ways in which a modular floodlight system can be implemented.

Some examples are provided below:

A scalable gesture sensor integrated within an object to provide a touch-sensitive surface on the object, the scalable gesture sensor comprising: a plurality of conductive lines disposed proximate to an exterior surface of the object, the plurality of conductive lines arranged such that a same two or more conductive lines of the plurality of conductive lines repeat a localized crossover pattern between one another across a portion of the exterior surface of the object to form a sensor grid having a plurality of repeated localized crossover patterns between the same two or more conductive lines; and a controller coupled to the plurality of conductive lines, the controller configured to: detect touch input to the two or more conductive lines by detecting a change in capacitance on the two or more conductive lines when a user's finger touches the two or more conductive lines; determine, based on detection of the touch input, a relative direction of touch input; and process the touch input having the determined relative direction, to provide touch data usable to control a computing device or an application at the computing device.

The touch input may be detected based on a change in capacitance to one or more crossover points between the two or more conductive lines when the user's finger touches the one or more crossover points.

The controller may be coupled to a power source.

The power source may include one or more photodiodes or solar cells integrated into the sensor grid.

The plurality of conductive lines may include a first set of conductive lines and a second set of conductive lines that cross over the first set of conductive lines; the first set of conductive lines may form multiple row groups; and the second set of conductive lines ma form multiple column groups.

The at least one row group of the multiple row groups may have a first pitch that is different than a second pitch of at least one other row group of the multiple row groups, or at least one column group of the multiple column groups has a third pitch that is different than a fourth pitch of at least one other column group of the multiple column groups.

The pitch may gradually decrease or increase between a set of conductive lines.

The at least one row group of the multiple row groups may be rotated two-dimensionally relative to at least one other row group of the multiple row groups, or at least one column group of the multiple column groups is rotated two-dimensionally relative to at least one other column group of the multiple column groups.

The rotation of the multiple row groups is gradually increasing or decreasing relative to at least one other row group of the multiple row groups, or the rotation for the multiple column groups is gradually increasing or decreasing relative to at least one other column group of the multiple column groups.

There may be at least one set of conductive lines comprising non-linearly shaped conductive lines, in particular wave lines or concentric lines.

The controller may be further configured to: determine that the touch input includes changes in capacitance to the plurality of conductive lines across multiple adjacent ones of the repeated localized pattern of crossover points over a duration of time; and determine the direction of the touch input relative to the sensor grid based on the touch input over the duration of time.

The repeated localized crossover pattern may comprise at least one submatrix of crossover points.

The controller may be coupled to a network interface configured to transmit the touch data to the computing device via a wireless network.

The plurality of conductive lines may be arranged in one of a serpentine pattern or a spiraling pattern to form the plurality of repeated localized crossover patterns.

The plurality of conductive lines may include conductive trace printed on an insulated multilayer material.

At least one electronic component associated with the touch-sensitive surface may be located spatially separate from the touch-sensitive surface, in particular integrated in an electrical socket or a floor.

The object may be wallpaper, carpet, or a laminate material.

The object may be a garment; and the plurality of conductive lines may be integrated into the garment via at least one of stitching, sewing, braiding, or embroidery.

The plurality of conductive lines may be insulated yarns.

The wearable garment may include a sleeve with an elbow area, a wrist area, and a shoulder area; the plurality of conductive lines are integrated into the sleeve of the garment; the plurality of conductive lines are arranged with a first pitch in one or more of the wrist area and the elbow area to provide a first resolution of touch input detection; and the plurality of conductive lines are arranged with a second pitch in a first area between the wrist area and the elbow area that is greater than the first pitch to provide a second resolution of touch input detection that is lower than the first resolution.

What is claimed is:

1. A scalable gesture sensor integrated within an object to provide a touch-sensitive surface on the object, the scalable gesture sensor comprising:
   a plurality of conductive lines disposed proximate to an exterior surface of the object, the plurality of conductive lines:
   including a first set of sensing lines having multiple individual sensing lines that run back and forth across a portion of the exterior surface of the object;
   including a second set of sensing lines having multiple additional individual sensing lines that run back and forth across the portion of the exterior surface of the object; and
   being arranged such that the second set of sensing lines crosses over the first set of sensing lines at multiple different locations to repeat a localized crossover pattern between one another across the portion of the exterior surface of the object to form a sensor grid having a plurality of repeated localized crossover patterns between the same sensing lines of the first and second sets of sensing lines, at least two of the multiple individual sensing lines of the first set of sensing lines overlapping one another outside of the sensor grid, at least two of the multiple additional individual sensing lines of the second set of sensing lines overlapping one another outside of the sensor grid; and a controller coupled to the plurality of conductive lines, the controller configured to:
   detect touch input to two or more conductive lines of the plurality of conductive lines by detecting a change in capacitance on the two or more conductive lines when a user's finger touches the two or more conductive lines;
   determine, based on detection of the touch input, a relative direction of the touch input; and
   process the touch input having the determined relative direction, to provide touch data usable to control a computing device or an application at the computing device.

2. The scalable gesture sensor of claim 1, wherein the touch input is detected based on a change in capacitance to one or more crossover points between the two or more conductive lines when the user's finger touches the one or more crossover points.

3. The scalable gesture sensor of claim 1, wherein the controller is coupled to a power source.

4. The scalable gesture sensor of claim 3, wherein the power source comprises one or more photodiodes or solar cells integrated into the sensor grid.

5. The scalable gesture sensor of claim 1, wherein:
   the first set of sensing lines runs back and forth across the portion of the exterior surface of the object to form multiple row groups; and
   the second set of sensing lines run back and forth across the portion of the exterior surface of the object to form multiple column groups.

6. The scalable gesture sensor of claim 5, wherein:
   at least one row group of the multiple row groups has a first pitch that is different than a second pitch of at least one other row group of the multiple row groups; or
   at least one column group of the multiple column groups has a third pitch that is different than a fourth pitch of at least one other column group of the multiple column groups.

7. The scalable gesture sensor of claim 5, wherein a pitch between a set of conductive lines gradually decreases or increases.

8. The scalable gesture sensor of claim 5, wherein:
   at least one row group of the multiple row groups is rotated two-dimensionally relative to at least one other row group of the multiple row groups; or
   at least one column group of the multiple column groups is rotated two-dimensionally relative to at least one other column group of the multiple column groups.

9. The scalable gesture sensor of claim 8, wherein:
   the rotation for the multiple row groups is gradually increasing or decreasing relative to at least one other row group of the multiple row groups; or
   the rotation for the multiple column groups is gradually increasing or decreasing relative to at least one other column group of the multiple column groups.

10. The scalable gesture sensor of claim 1, wherein at least one of the first or second sets of sensing lines comprises non-linearly shaped sensing lines, including wave lines or concentric lines.

11. The scalable gesture sensor of claim 1, wherein the controller is further configured to:
    determine that the touch input includes changes in capacitance to the plurality of conductive lines across multiple adjacent ones of the repeated localized pattern of crossover points over a duration of time; and determine the direction of the touch input relative to the sensor grid based on the touch input over the duration of time.

12. The scalable gesture sensor of claim 1, wherein the controller is coupled to a network interface configured to transmit the touch data to the computing device via a wireless network.

13. The scalable gesture sensor of claim 1, wherein the plurality of conductive lines are arranged in one of a serpentine pattern or a spiraling pattern to form the plurality of repeated localized crossover patterns.

14. The scalable gesture sensor of claim 1, wherein the plurality of conductive lines include conductive trace printed on an insulated multilayer material.

15. The scalable gesture sensor of claim 1, wherein at least one electronic component associated with the touch-sensitive surface is located spatially separate from the touch-sensitive surface, and is integrated in an electrical socket or a floor.

16. The scalable gesture sensor of claim 1, wherein the object is wallpaper, carpet, or a laminate material.

17. The scalable gesture sensor of claim 1, wherein:
the object is a wearable garment; and
the plurality of conductive lines are integrated into the garment via at least one of stitching, sewing, braiding, or embroidery.

18. The scalable gesture sensor of claim 17, wherein the plurality of conductive lines are insulated yarns.

19. The scalable gesture sensor of claim 17, wherein:
the wearable garment includes a sleeve with an elbow area, a wrist area, and a shoulder area;
the plurality of conductive lines are integrated into the sleeve of the garment;
the plurality of conductive lines are arranged with a first pitch in one or more of the wrist area and the elbow area to provide a first resolution of touch input detection; and
the plurality of conductive lines are arranged with a second pitch in a first area between the wrist area and the elbow area that is greater than the first pitch to provide a second resolution of touch input detection that is lower than the first resolution.

20. The scalable gesture sensor of claim 1, wherein each of the first and second sets of sensing lines cover an entire sensing area of the sensor grid.

* * * * *

UNITED STATES PATENT AND TRADEMARK OFFICE
CERTIFICATE OF CORRECTION

PATENT NO. : 12,008,204 B2
APPLICATION NO. : 18/001830
DATED : June 11, 2024
INVENTOR(S) : Alex Olwal and Thad Eugene Starner It is certified that error appears in the above-identified patent and that said Letters Patent is hereby corrected as shown below:

In the Claims

Column 17, Line 18: Claim 15, After "sensitive" before "is", delete "surface, and" add --surface and--

Signed and Sealed this
Twentieth Day of August, 2024

Katherine Kelly Vidal
*Director of the United States Patent and Trademark Office*